United States Patent
Piazza et al.

(10) Patent No.: US 10,393,967 B2
(45) Date of Patent: Aug. 27, 2019

(54) OPTICAL WAVEGUIDE, CORRESPONDING COUPLING ARRANGEMENT AND METHOD PROVIDING TRANSVERSE PROPAGATION PATH

(71) Applicant: STMICROELECTRONICS S.R.L., Agrate Brianza (IT)

(72) Inventors: Marco Piazza, Milan (IT); Piero Orlandi, Arcevia (IT); Antonio Canciamilla, Olgiate Olona (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/968,625

(22) Filed: May 1, 2018

(65) Prior Publication Data
US 2018/0321445 A1 Nov. 8, 2018

(51) Int. Cl.
  *G02B 6/30* (2006.01)
  *G02B 6/122* (2006.01)
  *G02B 6/12* (2006.01)
  *G02B 6/34* (2006.01)

(52) U.S. Cl.
  CPC ......... *G02B 6/305* (2013.01); *G02B 6/12002* (2013.01); *G02B 6/1228* (2013.01); *G02B 6/1223* (2013.01); *G02B 6/34* (2013.01); *G02B 2006/12061* (2013.01); *G02B 2006/12147* (2013.01)

(58) Field of Classification Search
  CPC .... G02B 6/305; G02B 6/1223; G02B 6/1228; G02B 2006/12147; G02B 2006/12061
  See application file for complete search history.

(56) References Cited

U.S. PATENT DOCUMENTS

| | | | | |
|---|---|---|---|---|
| 5,138,676 A * | 8/1992 | Stowe | ................... | G02B 6/2552 385/123 |
| 7,783,146 B2 * | 8/2010 | Blauvelt | ............ | G02B 6/12002 385/30 |
| 7,853,103 B2 * | 12/2010 | Blauvelt | ............ | G02B 6/12002 349/187 |
| 7,885,499 B2 * | 2/2011 | Blauvelt | ............ | G02B 6/12002 385/30 |
| 9,405,066 B2 | 8/2016 | Mahgerefteh et al. | | |
| 9,529,151 B2 * | 12/2016 | Goi | ........................ | G02B 6/126 |

(Continued)

OTHER PUBLICATIONS

Van Thourhout et al., "Coupling mechanisms for a heterogeneous silicon nanowire platform," *Semiconductor Science and Technology* 23(6):1-9 (10 pages), May 12, 2008.

(Continued)

*Primary Examiner* — Andrew Jordan
(74) *Attorney, Agent, or Firm* — Seed IP Law Group LLP (57) ABSTRACT

An optical waveguide includes opposed end sections for optical radiation to propagate in a longitudinal direction therebetween and an intermediate section extending between the end sections. The intermediate section includes first and second portions superposed in a superposition direction. One of the opposite end sections has a first height in the superposition direction corresponding to the sum of the heights of the superposed portions of the intermediate section. The other of the opposite end sections has a second height in the superposition direction corresponding to the height of the first of the superposed portions of the intermediate section.

19 Claims, 5 Drawing Sheets

(56) References Cited

U.S. PATENT DOCUMENTS

| | | | |
|---|---|---|---|
| 9,746,607 B2* | 8/2017 | Collins | G02B 6/1228 |
| 9,817,186 B2* | 11/2017 | Kamei | G02B 6/126 |
| 9,864,141 B1* | 1/2018 | Lin | G02B 6/2726 |
| 10,215,919 B2* | 2/2019 | Collins | G02B 6/305 |
| 2003/0081902 A1* | 5/2003 | Blauvelt | G02B 6/12002 385/50 |
| 2005/0213889 A1* | 9/2005 | Blauvelt | G02B 6/12002 385/50 |
| 2007/0110369 A1* | 5/2007 | Blauvelt | G02B 6/12002 385/50 |
| 2007/0211989 A1* | 9/2007 | Blauvelt | G02B 6/12002 385/28 |
| 2008/0226224 A1* | 9/2008 | Blauvelt | G02B 6/12002 385/14 |
| 2010/0314027 A1* | 12/2010 | Blauvelt | G02B 6/12002 156/91 |
| 2012/0224813 A1 | 9/2012 | Chen et al. | |
| 2014/0133796 A1* | 5/2014 | Dong | G02B 6/126 385/11 |
| 2015/0219853 A1 | 8/2015 | Kumar et al. | |
| 2016/0178842 A1* | 6/2016 | Goi | G02B 6/126 385/11 |
| 2016/0266312 A1* | 9/2016 | Demaray | G02B 6/132 |
| 2016/0306117 A1 | 10/2016 | Middlebrook et al. | |
| 2016/0327742 A1* | 11/2016 | Collins | G02B 6/1228 |
| 2016/0327759 A1* | 11/2016 | Keyvaninia | H01S 5/0218 |
| 2017/0068048 A1* | 3/2017 | Kamei | G02B 6/126 |
| 2017/0343734 A1* | 11/2017 | Collins | G02B 6/305 |
| 2018/0017732 A1* | 1/2018 | Tassaert | G02B 6/12002 |
| 2018/0045887 A1* | 2/2018 | Shi | G02B 6/1228 |
| 2018/0156970 A1* | 6/2018 | Ohara | G02B 6/30 |
| 2018/0180806 A1* | 6/2018 | Ohara | G02B 6/30 |
| 2018/0231714 A1* | 8/2018 | Collins | G02B 6/12002 |
| 2018/0259710 A1* | 9/2018 | Stabile | G02B 6/1228 |
| 2018/0275341 A1* | 9/2018 | Demaray | G02B 6/132 |
| 2018/0275342 A1* | 9/2018 | Shaw | G02B 6/2821 |
| 2018/0321445 A1* | 11/2018 | Piazza | G02B 6/12002 |
| 2019/0033520 A1* | 1/2019 | Lin | G02B 6/1228 |

OTHER PUBLICATIONS

Vivien et al. (eds.), *Handbook of Silicon Photonics*, Taylor & Francis Group, Boca Raton, Florida, 2013, Chapter 3, Bogaerts et al., "Off-Chip Coupling," pp. 98-138 (49 pages).

* cited by examiner

OPTICAL WAVEGUIDE, CORRESPONDING COUPLING ARRANGEMENT AND METHOD PROVIDING TRANSVERSE PROPAGATION PATH

BACKGROUND

Technical Field

The description relates to, e.g., integrated optical waveguides.

One or more embodiments may apply for instance to coupling arrangements of integrated optical waveguides with external systems, such as optical fibers, via transmission media.

Description of the Related Art

Adiabatic coupling provides a potentially lossless optical mode transformation between waveguides with different refractive index contrast and geometry. It may be used to transfer optical power from, e.g., optical fibers (about 10 microns-1 micron=$10^{-6}$ m—mode diameter, with low refractive index contrast) to, e.g., silicon photonic waveguides (about 0.2 micron-1 micron=$10^{-6}$ m—mode diameter, with high refractive index contrast).

An optical mode transformation occurs as a result of a change in refractive index and/or geometry in one waveguide or between two waveguides. An optical mode is representative of the field pattern of an electromagnetic radiation: for instance, a transverse optical mode of an electromagnetic radiation is an electromagnetic field pattern of radiation measured in a plane perpendicular (i.e., transverse) to the propagation direction of the beam.

In comparison with other coupling methods (e.g., grating couplers), adiabatic coupling offers a wideband coupling, i.e., notionally lossless operation over a wide wavelength range (about 100 nm–1 nm=$10^{-9}$ m).

In integrated optical systems including one or more adiabatic coupling steps between two waveguides having different refractive index contrasts, adiabatic coupling between a higher-contrast waveguide and a lower-contrast waveguide may pose some limitations on the design of the higher-contrast waveguide. A specific design of the waveguides, including width, height, refractive index, length, etc., may determine the efficiency of the coupling between the multiple layers of the waveguides.

Documents such as U.S. Pat. No. 9,405,066 B2 or the article D. Van Thourhout et al.: "Coupling mechanisms for a heterogeneous silicon nanowire platform", Semiconductor Science And Technology, 23 (2008) 064004, pp. 1-9 are exemplary of the prior art.

BRIEF SUMMARY

One or more embodiments address the issue of the coupling losses due to difference in refractive index contrast between waveguides.

In one or more embodiments, an optical waveguide includes first and second end sections for optical radiation to propagate in a longitudinal direction therebetween and an intermediate section extending between the first and second end sections and including first and second portions superposed in a superposition direction transverse to the longitudinal direction. The first end section has a first height in said superposition direction corresponding to a sum of heights of the first and second portions of the intermediate section in said superposition direction, and the second end section has a second height in said superposition direction corresponding to the height of the first portion of the intermediate section.

One or more embodiments may relate to a corresponding coupling arrangement (e.g., an optical connector) and a corresponding method.

The claims are an integral part of the disclosure of the invention as provided herein.

One or more embodiments may involve adopting an adiabatic coupling technology for broadband coupling.

One or more embodiments may concern an optical system including two or more layers, optically coupled by means of adiabatic mode transformation (i.e., adiabatic coupling).

One or more embodiments may provide a three-layer adiabatic transition, including an "intermediate-contrast" refractive index waveguide between a "low-contrast" refractive index waveguide and a "high-contrast" refractive index waveguide.

One or more embodiments may provide an improved design for such an intermediate waveguide.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1A:
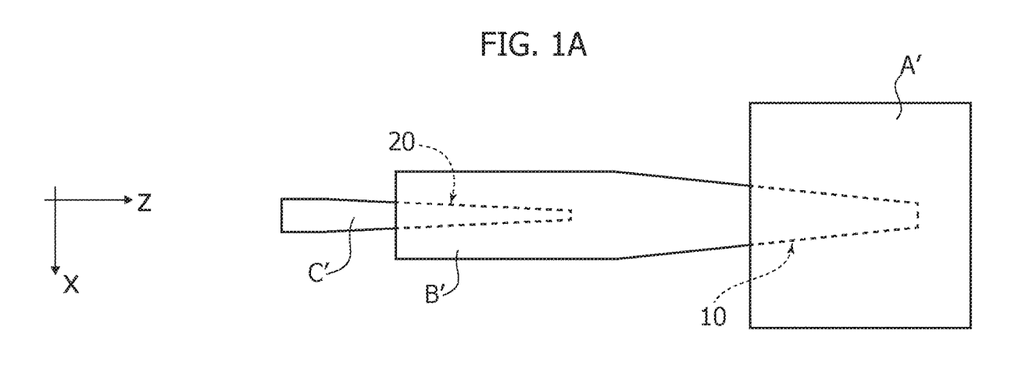
FIGS. 1A and 1B are top and side views, respectively, exemplary of adiabatic coupling of optical waveguides.

FIGS. 1A (top view) and 1B (side view) are exemplary of an optical system comprising a cladding material 100 (visible only in FIG. 1B) and three waveguides: a waveguide A' including material, e.g., glass or polymer, having a "low" refractive index of about 1.5, a waveguide B' including material, e.g., silicon nitride, having an "intermediate" refractive index of about 1.9, and a waveguide C' including material, e.g., silicon, having a "high" refractive index of about 3.5.

The exemplary materials and/or numerical values given (that is 1.5, 1.9 and 3.5) are merely for ease of description and are not to be construed in a limiting sense of the embodiments. This applies primarily (and not exclusively) to the definition of the refractive index values given as "low", "intermediate", and "high", such definitions being relative definitions so that, just to make an example, a "low" or "high" value in one embodiment may represent an "intermediate" value in another embodiment.

Figure 1B:
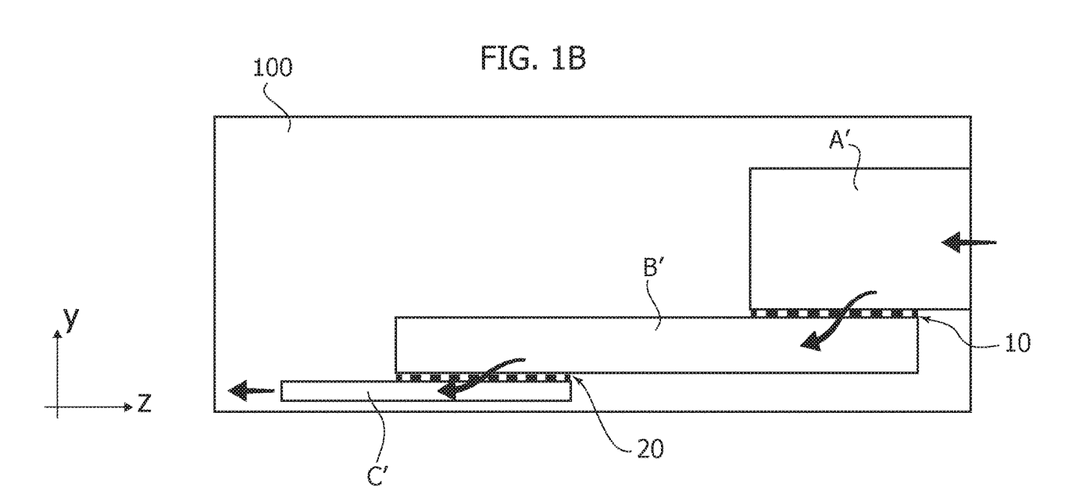

In FIG. 1, the dashed lines represent the spatial regions at which optical mode transformations occur, e.g., an adiabatic coupling (A'-B; B'-C'), between two optical waveguides (A' and B; B' and C'), from a lower refractive index material to a higher refractive index material, via an interaction interface (10; 20) having a certain interaction length.

An electromagnetic propagation (e.g., an electromagnetic wave exemplified in FIG. 1B by arrows pointing from right to left), received, e.g., from an optical fiber and transmitted to, e.g., an integrated optical circuit, may take place in the waveguides by being substantially confined within the waveguides A', B' and C' due to a difference in refractive index between the waveguides A', B' and C' and the cladding material 100.

The optical radiation (briefly "light") may be able to "leak" out of one waveguide into another waveguide, at the interaction surface.

Adiabatic coupling as discussed may exhibit certain losses due to an abrupt change in refractive index between two waveguides, one having a higher refractive index, e.g., B', one having a lower refractive index, e.g., A'.

An attempt to address that issue may involve tapering the width of the waveguide having a higher refractive index along the electromagnetic propagation direction, in order to obtain a favorable coupling condition between two modes, e.g., by aiming at achieving substantially identical values for the effective refractive index of the two waveguides, that is $neff_{B'}=neff_{A'}$. The effective refractive index neff is a number quantifying the phase delay per unit length in a waveguide relative to the phase delay in vacuum.

Such an approach is exemplified in FIG. 1A by referring for simplicity to a "horizontal" taper (that is, a varying width), a dependency of the refractive index on the thickness being also possible.

It was observed that such a longitudinal "horizontal" tapering—that is, by leaving the height or thickness of the waveguides constant (see FIG. 1B)—does not facilitate, for instance a good coupling of the waveguide B' with the waveguide A' unless the waveguide B' is relatively thin. In fact, it was observed that the adiabatic transition may result in an upper bound design limit to the height of the higher-contrast (e.g., B') waveguide.

Figure 2A:
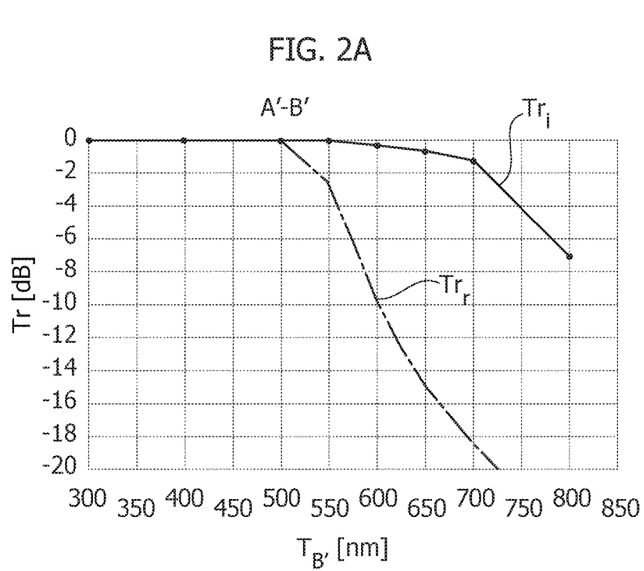
FIGS. 2A and 2B are diagrams exemplary of the dependence of transmission loss on the thickness of a waveguide involved in an optical transmission.

The diagram of FIG. 2A is exemplary of coupling transmission Tr in the adiabatic coupling between waveguides A' and B' in the arrangement of FIGS. 1A and 1B, as a function of the thickness $T_{B'}$ of the waveguide B', for an ideal waveguide, $Tr_i$ (solid line), and a real waveguide, $Tr_r$ (broken line).

Figure 3:
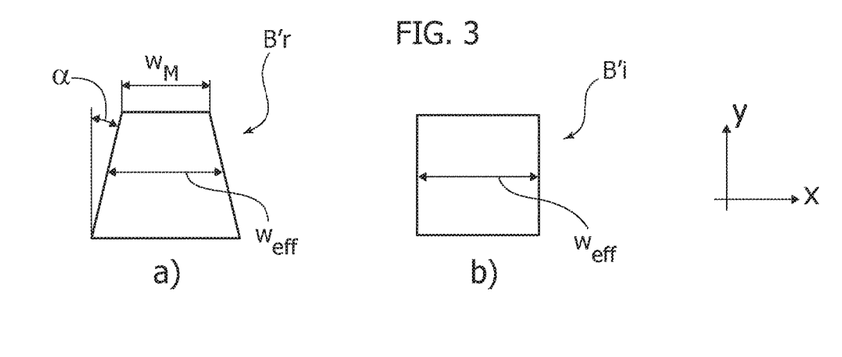
FIG. 3, portions a) and b), are cross-sectional views of a real and an ideal waveguide core.

As shown at B'r in portion a) of FIG. 3, a "real" optical waveguide may exhibit a trapezoidal cross-sectional shape resulting in an effective width ($w_{eff}$) larger than the "mask" width ($w_M$). Such a shape is in contrast with an ideal rectangular shape (as shown at B'i in portion b) of FIG. 3) and may be related to the processes involved in the fabrication of dielectric waveguides (such as SiN waveguides).

Figure 6:
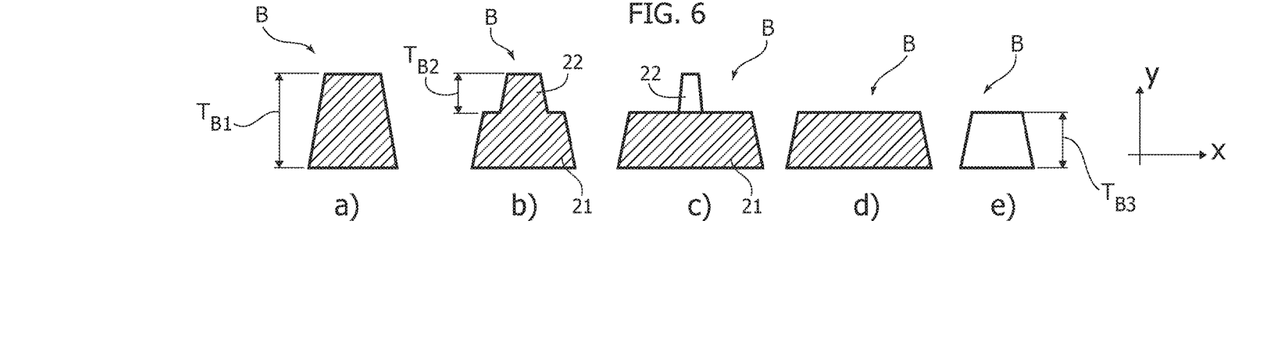
FIG. 6, portions a) to e), are exemplary views of embodiments.

In certain ones of the figures, such as FIG. 3 and FIG. 6, such a trapezoidal shape of real waveguides was deliberately emphasized for the sake of understanding.

The diagram in FIG. 2A is exemplary of a possible behavior with conventional complementary metal oxide semiconductor (CMOS) and packaging materials: e.g., polymeric material and SiN for the lower-contrast and higher-contrast waveguides, respectively.

The limitation on the waveguide B' thickness, $T_{B'}$, is clearly visible, with the transmission $Tr_i$ becoming negligible below 550 nm (1 nanometer=$10^{-9}$ m), in this specific case.

A stricter boundary condition applies to the design of the waveguide B' if the real shape of such optical waveguides is taken into account, see the real loss curve $L_r$.

As a first approximation, the waveguide effective refractive index neff depends only on the effective width, i.e., $neff_r$ (the real effective refractive index) is about the same as $neff_i$ (the ideal effective refractive index).

Reducing the height of the, e.g., SiN waveguide B' may facilitate making performance of the real waveguide shape closer to the performance of an ideal shape. For example, by considering a sidewall (taper) angle of, e.g., 4 deg, one may consider reducing the height from 550 nm to about 500 nm (1 nm=$10^{-9}$ m) for the exemplary case of FIG. 2A.

It was also observed that the dependence of transmission $Tr_r$ on, e.g., SiN thickness, $T_{B'}$, is steeper if real waveguide shape is taken into account.

As a result, it was observed that the adiabatic coupling between the (e.g., SiN) higher-contrast waveguide B' and the (e.g., polymer/glass) lower-contrast waveguide A' may pose certain limitations on the design of the higher-contrast waveguide B'. For the exemplary case considered, the height of the higher-contrast waveguide B' is limited to 500 nm.

If the higher-contrast waveguide B' is used for other photonic devices, this limitation may affect the overall performance of photonics circuit, so that a design trade-off may come into play.

Also, as depicted in FIGS. 1A and 1B, an, e.g., SiN waveguide B' may be used as an intermediate coupling between a low contrast waveguide (A', suitable for out-coupling of light with, e.g., a single-mode optical fiber (SMF) and a high contrast, e.g., Si waveguide (C', suitable for, e.g., active devices integration, such as modulators or photodetectors).

In such a case, with the waveguide B' acting as an intermediate coupling for adiabatic coupling towards a waveguide (waveguide C') having an even higher index contrast, the upper bound condition described in FIG. 2A may result in severe limitation for the optical coupling performance of the transition B'-C'.

Figure 2B:
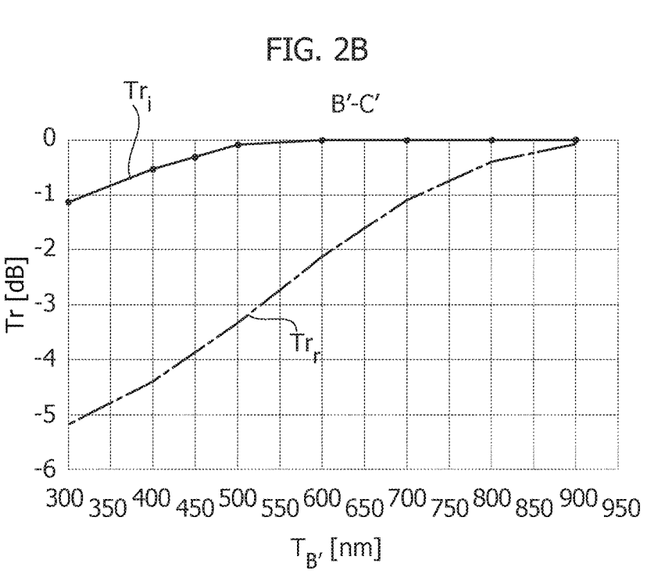

This transition will in fact benefit from a thicker intermediate waveguide B', as exemplified in FIG. 2B. This is an exemplary diagram for transmission Tr between the waveguides B' and C' as a function of thickness $T_{B'}$ of the waveguide B', again in an ideal scenario (continuous line Tr) and in a real scenario (broken line $Tr_r$).

The same type of analysis of adiabatic coupling already discussed previously for the coupling (transition) A'-B' may be applied to the transition B'-C', where waveguide B' in this case represents the lower-contrast waveguide.

This results in another design trade-off for the intermediate waveguide B' in terms of thickness $T_{B'}$, which in this case suggest to increase the thickness or height of the, e.g., SiN waveguide B' in order to improve performance.

The overall coupling performance of A'-B'-C' transition is therefore adversely affected by such contrasting design trade-offs: the coupling loss may be relevant and not compatible with possible product implementations.

Figure 4:
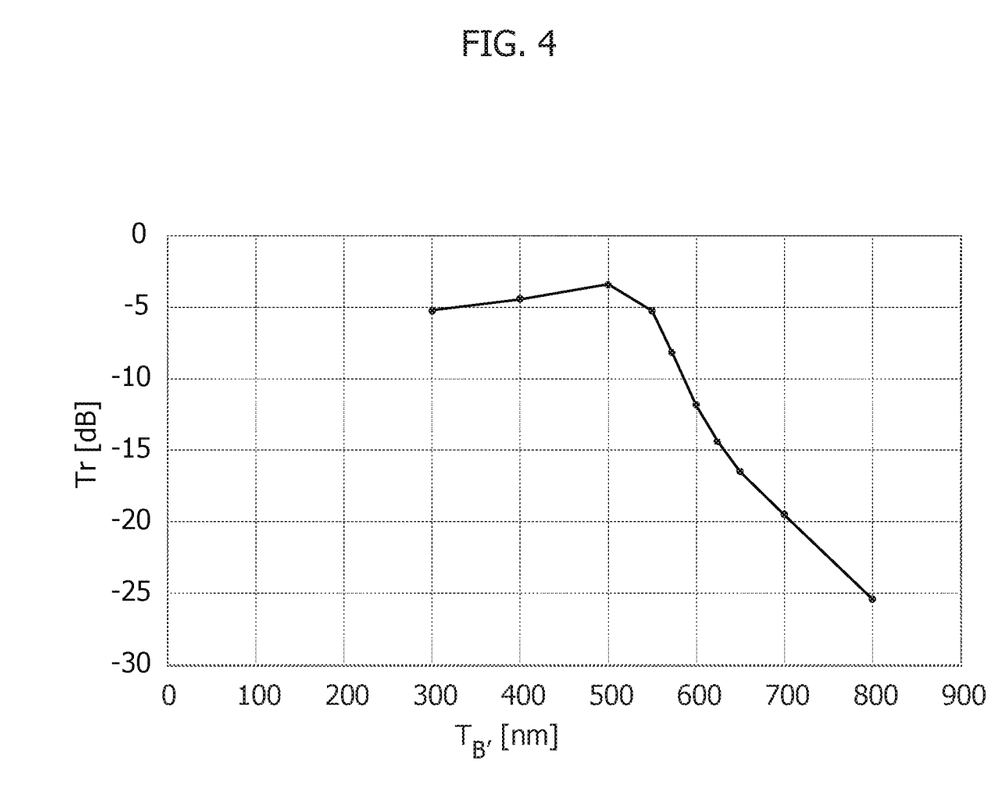
FIG. 4 is a diagram exemplary of the dependence of transmission loss on the thickness of one waveguide taking part in the optical transmission.

An example of the trade-off condition in terms of loss is shown in FIG. 4, where for example 500 nm is chosen as trade-off value for SiN layer thickness. The resulting loss achieved (about 3.5 dB) may be hardly acceptable for practical applications.

It will be also appreciated that this may turn out to be an "unstable" design point, e.g., sensitive to fabrication tolerances: e.g., a 10% thickness variation (such as, say, 550 nm instead of 500 nm), may result in an additional 1.5 dB loss.

In other possible applications, a higher-contrast waveguide may be used to propagate light over a photonic chip and straight and bent waveguide paths may be used for that purpose. The waveguide height may be a relevant parameter for the design of simple straight and bent waveguides, insofar as it may have an impact on loss due to leakage into substrate and on waveguide bending loss.

For instance, if an, e.g., SiN waveguide is considered and a reduction of loss due to leakage towards a Si substrate is sought, for a given buried oxide (BOX), a relatively thick waveguide can be used. It was observed that the SiN waveguide leakage loss decreases with an increase of the SiN waveguide height.

In another example, the same analysis can be done on SiN waveguide bending loss for a given bending radius, showing a loss decreasing with the increase of the waveguide thickness.

To sum up, one or more embodiments may address the issues discussed in providing at least an adiabatic coupling between two waveguides of different index contrast (difference of core/cladding refractive indexes).

In one or more embodiments a higher index contrast waveguide can be used for additional optical functionalities such as:
- a second adiabatic coupling with a higher index contrast waveguide;
- low loss optical routing including propagation along straight waveguides;
- low loss and compact optical routing including propagation in bent waveguides.

One or more embodiments facilitate overcoming the contrasting trade-off conditions discussed previously, making it possible to reduce the overall loss of an optical system.

One or more embodiments may provide a three-layer adiabatic transition of the same type discussed previously in connection with FIG. 1, including an "intermediate" refractive index, e.g., SiN waveguide, referred to as waveguide B, a "low-contrast" refractive index, e.g., polymer/glass waveguide, referred to as A and a "high-contrast" refractive index, e.g., Si waveguide, referred to as C, as shown in FIGS. 5A-7B.

One or more embodiments may provide an improved design for the intermediate waveguide B.

Figure 5A:
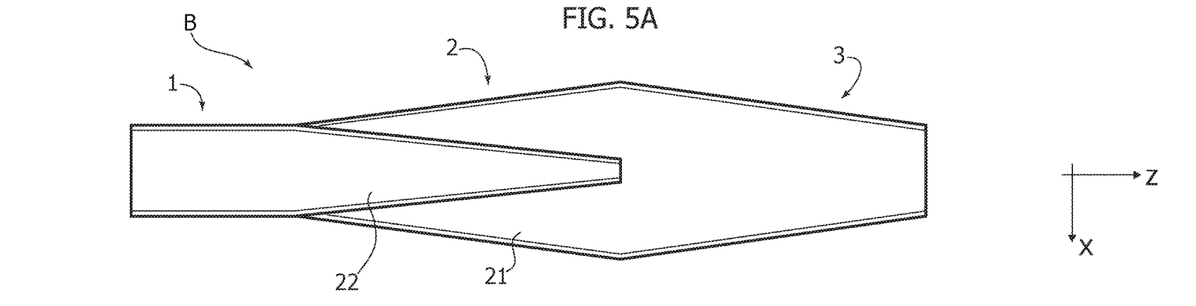
FIGS. 5A, 5B are exemplary top and side views of embodiments.
Figure 5B:
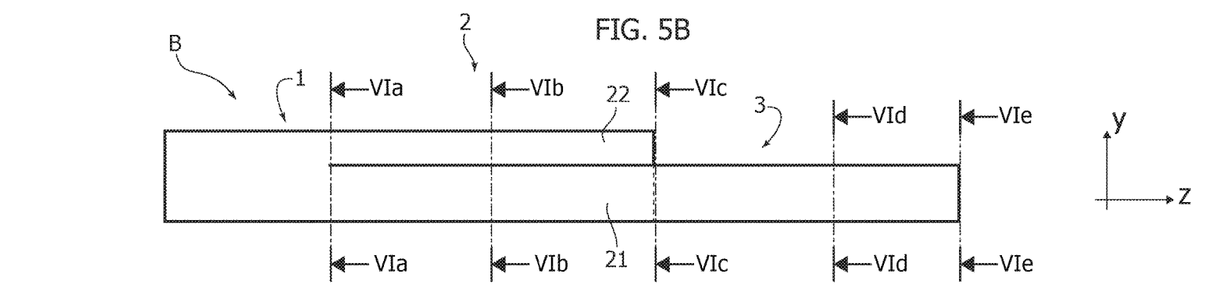

A design for a waveguide B according to one or more embodiments is exemplified in the plan and side views of FIGS. 5A and 5B in the views of portions a), b), c), d) and e) of FIG. 6.

Specifically the views of portions a), b), c), d) and e) of FIG. 6 are views along lines VIa-VIa, VIb-VIb, VIc-VIc, VId-VId, and VIe-VIe in FIG. 5B.

In one or more embodiments, the waveguide B may be regarded as including three sections indicated 1, 2 and 3, respectively, cascaded in a first direction from section 1 to section 3.

The first section 1 has a height $T_{B1}$ and a substantially constant cross section (e.g., with a trapezoidal "real" shape with a constant effective width).

The third section 3 has a height $T_{B3}$ smaller than $T_{B1}$ and a cross section (e.g., with a trapezoidal "real" shape) with an effective width decreasing in the (first) direction from the second section 2 to the third section 3: that is the third section 3 has a tapered (plan) shape with a cross section having a taper (a decreasing cross section) in the direction away from the first section 1, such taper starting from an effective width at a transition with the second section 2 (see, e.g., part c) of FIG. 6) which is larger than the effective width of section 1 (see, e.g., part a) of FIG. 6) and leads to an effective width at the end of the third section (see, e.g., part e) of FIG. 6) roughly corresponding to the effective width of section 1 (see, e.g., parts a) and e) of FIG. 6).

The second section 2 extending between the first section 1 and the third section 3 can be regarded as including two superposed portions:
- a first portion 21 having a height corresponding (e.g., substantially equal) to the height $T_{B3}$ of the third section 3,
- a second portion 22 (partly) superposed to the first portion 21 and having a height $T_{B2}$ corresponding (e.g., substantially equal) to the difference between the height $T_{B1}$ of the first section 1 and the height $T_{B3}$ of the third section 3 (that is $T_{B2}=T_{B1}-T_{B3}$) so that, where the second portion 22 is superposed on the first portion 21, the second section 2 has substantially the same height of the first section 1.

Also, in one or more embodiments as exemplified in FIG. 5:
- the first portion 21 of the second section 2 of the waveguide B has a flared shape in the direction away from the first section 1, such flared shape starting from an effective width which corresponds to the effective width of section 1 (see, e.g., part a) of FIG. 6) and leading to an effective width which corresponds to the effective width of the end of section 3 facing section 2 (see, e.g., part c) of FIG. 6);
- the second portion 22 of the second section 2 of the waveguide B has a tapered shape in the direction away from the first section 1, such tapered shape starting from an effective width which corresponds to the effective width of section 1 (see, e.g., part a) of FIG. 6) and leading to a smaller effective width at the terminal end (edge) of section 2 facing section 3 (see, e.g., part c) of FIG. 6).

In one or more embodiments, the greatest effective width of the first portion 21 of the second section 2 and of the third section 3 corresponds to a position directly under the end of the second portion 22 of the section 2.

In one or more embodiments the first portion 21 of the second section 2 and the third section 3 may be substantially mirror-symmetrical with respect to the transition between the second section 2 and the third section 3.

It will be appreciated that, in one or more embodiments, such tapering may not be present and one or more of the waveguides A, B and C may be substantially straight.

One or more embodiments as exemplified herein in connection with FIGS. 5 and 6 may involve an additional etch level (partial etch) for the waveguide B (SiN in the exemplary case considered herein) or two separate steps of deposition of a same material. See, e.g., Handbook of Silicon Photonics—Edited by Laurent Vivien and Lorenzo Pavesi, CRC Press-2013, pp. 105-106 for a review of related technologies.

In one or more embodiments, a combination of two (or more) etch levels on the same waveguide B can provide a design of waveguide patterning as exemplified in FIG. 5.

In one or more embodiments such patterning of the waveguide designated B will facilitate an efficient adaptation of the optical mode between sections with different heights (1 and 3 in FIG. 5C).

Figure 7A:
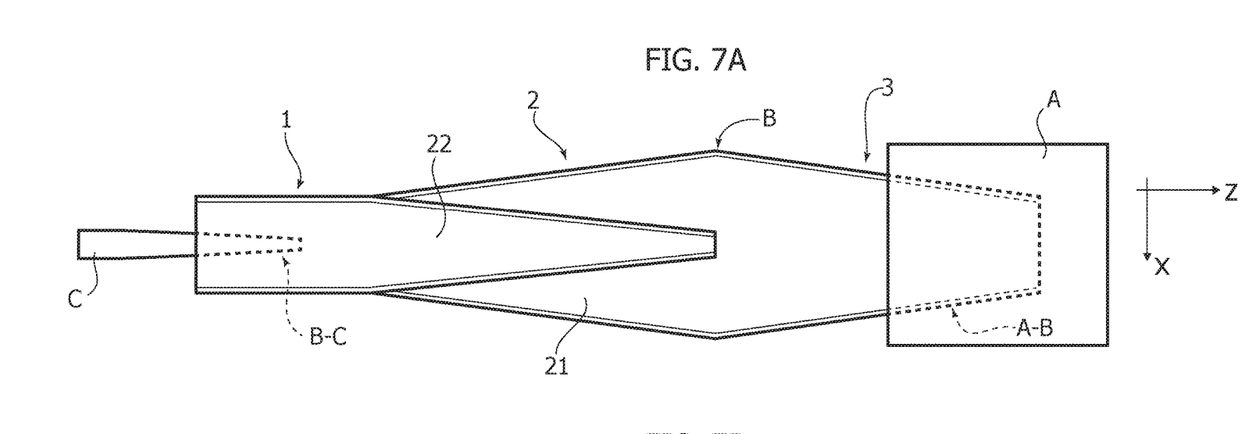
FIGS. 7A and 7B are exemplary top and side views of embodiments.
Figure 7B:
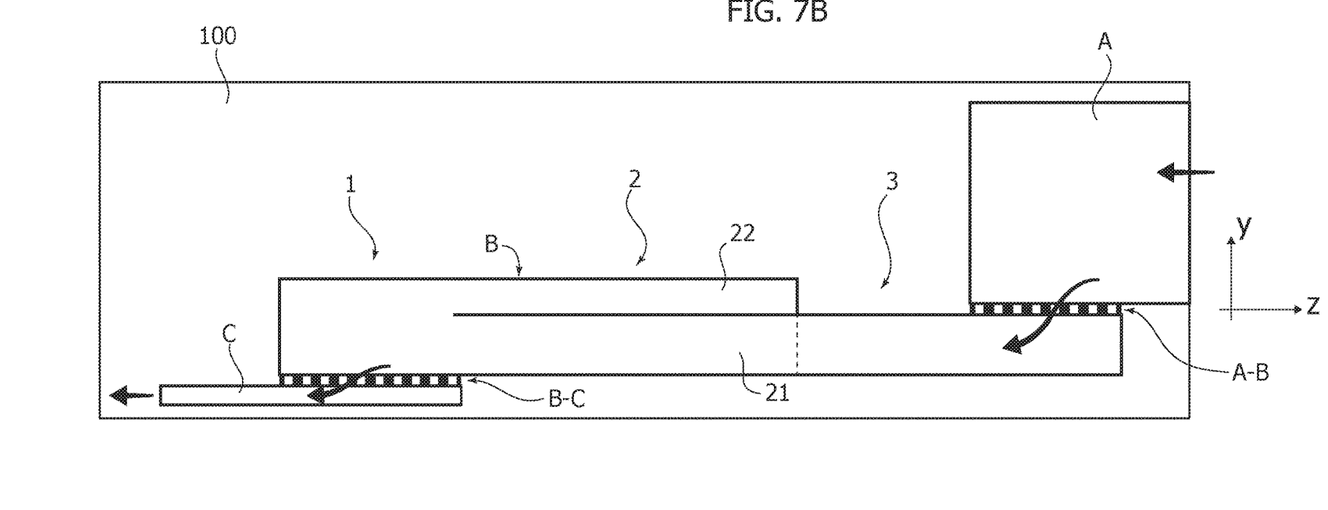

This may facilitate reducing overall system loss in a coupling arrangement of waveguides A-B-C as exemplified in FIGS. 7A and 7B.

One or more embodiments as exemplified in FIGS. 7A and 7B (with direct reference to the coupling arrangement discussed previously in connection with FIGS. 1A and 1B) include a three layer adiabatic transition (A-B, B-C) between:
- a waveguide A: low index contrast (e.g., glass or polymer), as used, e.g., for fiber coupling;
- an (intermediate) waveguide B: intermediate index contrast (e.g., SiN); and
- a waveguide C: high index contrast (e.g., Si)—as used, e.g., for photonic active optical components (modulators or photodetectors, for instance).

One or more embodiments may comprise a common cladding material 100 (visible only in FIG. 7B).

One or more embodiments make it possible to provide an "intermediate" waveguide B by overcoming constraints on the layer height.

In one or more embodiments, a "real" waveguide B may exhibit a first, "large" height $T_{B1}$ at one end and a second, "small" height $T_{B2}$ at other end, thus making it possible to negotiate contrasting constraints as exemplified, e.g., in FIGS. 2A and 2B.

In other words, in one or more embodiments, each transition can be devised independently from the other. This results in a reduction of the overall transmission Tr for the system. Also, process tolerance may be improved insofar as one or more embodiments are less sensitive to process variations than conventional arrangements. Such a design may imply tip dimensions larger than conventional ones and also larger than the critical dimensions (CDs) for the reference technologies.

By means of one or more embodiments, the height $T_B$ of the intermediate waveguide B may be chosen independently for the two adiabatic coupling sections (A-B, B-C), thus facilitating increasing the coupling efficiency for the two steps.

In one or more embodiments, the introduction of two different heights in the waveguide B may involve devising an etch transition (highlighted in FIGS. 5A and 5B) between the sections 2 and 3 of a waveguide B, which results in an additional loss contribution.

The overall loss of an arrangement according to one or more embodiments, as exemplified in FIGS. 5 to 7, has been evaluated by selecting a height $T_{B3}$ of about 430 nm a and a height $T_{B1}$ of about 800 nm.

This was found to result in substantially 0 dB loss at the transition between waveguides A and B while resulting in a loss in the transition between waveguides B and C less than 0.5 dB. An additional loss of 0.1 dB was found to occur as a result of the transition between the portions 21 and 22 of section 2 of the waveguide B, that is the transition between the full-height and etched-height portions of waveguide B.

In one or more embodiments, the total loss is thus 0 dB (A–B)+0.5 dB (B–C)+0.1 dB (etch transition)=about 0.6 dB, which is significantly less than the loss of 3.5 dB shown in FIG. 4.

One or more embodiments may be extended to adiabatic transitions between more than three layers, with the solution of one or more embodiments implemented at the intermediate layers. As noted, a waveguide B according to one or more embodiments may be used to implement additional photonic components such as low loss straight or bent waveguides. These components may take advantage from the introduction of one or more embodiments, which permit an independent choice of waveguide heights between adiabatic coupler sections (relatively thin waveguide) and straight or bent routing sections (relatively thick waveguide). The overall loss for this system may be reduced as in the case discussed previously.

One or more embodiments may thus concern an optical waveguide (e.g., B) having opposite end sections (e.g., 1, 3) for optical radiation to propagate in a longitudinal direction therebetween (see, e.g., z in FIGS. 5A and 5B) and an intermediate section (e.g., 2) extending between the end sections, wherein:
- the intermediate section includes first (e.g., 21) and second (e.g., 22) portions superposed in a superposition direction (e.g., y in FIGS. 5B and 6),
- one (e.g., section 1) of the opposite end sections has a first height (e.g., $T_{B1}$) in said superposition direction corresponding (e.g., substantially equal) to the sum of the heights (e.g., $T_{B2}$, $T_{B3}$) of the superposed portions of the intermediate section in said superposition direction,
- the other (e.g., section 3) of the opposite end sections has a second height (e.g., $T_{B3}$) in said superposition direction corresponding (e.g., substantially equal) to the height of the first (e.g., portion 21) of the superposed portions of the intermediate section.

In one or more embodiments:
- said one (e.g., section 1) of the opposite end sections may be joined to both the first and the second superposed portions of the intermediate section (see, e.g., a) in FIG. 6),
- said other (e.g., section 3) of the opposite end sections is joined (only) to the first of the superposed portions of the intermediate section (see, e.g., c) in FIG. 6, where only portion 21 is cross-sectioned in order to show that portion 22 ends there).

In one or more embodiments, the first of the superposed portions of the intermediate section may have a width transverse said longitudinal direction (see, e.g., x transverse to z in FIG. 5A) which increases from said one of the opposite end sections towards said other of the opposite end sections.

In one or more embodiments, the second of the superposed portions of the second section may have a width transverse said longitudinal direction which decreases from said one of the opposite end sections towards said other (3) of the opposite end sections.

In one or more embodiments, said other of the opposite end sections may have a width transverse said longitudinal direction which decreases away from said intermediate section.

In one or more embodiments, the first of the superposed portions of the intermediate section and the third section may have complementary tapers (e.g., substantially symmetrical as a shape/structure, with possibly different dimensions) with respect to the transition between the intermediate section and said other of the opposite end sections.

One or more embodiments may include said second portion of the intermediate section etched out of material including said first portion superposed thereto.

In one or more embodiments an optical coupling arrangement may include:
an optical waveguide according to one or more embodiments,
first (e.g., A) and second (e.g., C) further optical waveguides adiabatically coupled with the opposite end sections of said optical waveguide, the optical waveguide providing an optical propagation path between said first and second further optical waveguides.

In one or more embodiments:
the first further optical waveguide may have a first (core-to-cladding) refractive index contrast,
the second further optical waveguide may have a second refractive index contrast, said second refractive index contrast higher than said first refractive index contrast,
said optical waveguide may have a respective refractive index contrast, said respective refractive index contrast intermediate between said first refractive index contrast and said second refractive index contrast.

In one or more embodiments:
the first further optical waveguide may include a glass or polymer waveguide,
the second further optical waveguide may include a silicon waveguide,
said optical waveguide may include a silicon nitride waveguide.

One or more embodiments may include a waveguide cladding (e.g., 100 illustrated in FIG. 1B or 7B) common to said optical waveguide and said first and second further optical waveguides.

In one or more embodiments, a method of producing an optical waveguide according to one or more embodiments may include producing said first height (TO and said second height ($T_{B3}$) by partial etching or by separate steps of material deposition as applied, e.g., to those sections/portions where the thickness is reduced for $T_{B1}$ to $T_{B3}$.

It will be appreciated that in one or more embodiments the separate steps of material deposition may involve either different materials or a same material.

Without prejudice to the underlying principles, the details and embodiments may vary, even significantly, with respect to what has been disclosed by way of example only, without departing from the extent of protection.

The extent of protection is defined by the annexed claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical waveguide, comprising:
first and second end sections for optical radiation to propagate in a longitudinal direction therebetween and an intermediate section extending between the first and second end sections, wherein:
the intermediate section includes first and second portions superposed in a superposition direction transverse to the longitudinal direction,
the first end section has a first height in said superposition direction corresponding to a sum of heights of the first and second portions of the intermediate section in said superposition direction, a top surface of the first end section being substantially coplanar with a top surface of the intermediate section and a bottom surface of the first end section being substantially coplanar with a bottom surface of the intermediate section, and
the second end section has a second height in said superposition direction corresponding to the height of the first portion of the intermediate section, a top surface of the second end section being substantially coplanar with a top surface of the first portion of the intermediate section and a bottom surface of the second end section being substantially coplanar with a bottom surface of the first portion of the intermediate section.

2. The optical waveguide of claim 1, wherein:
the first end section is joined to both the first and the second portions of the intermediate section, and
the second end section is joined to the first portion of the intermediate section.

3. The optical waveguide of claim 1, wherein the first portion of the intermediate section has a width transverse to said longitudinal direction and said superposition direction which increases from said first end section towards the second end section.

4. The optical waveguide of claim 1, wherein the second portion of the intermediate section has a width transverse said longitudinal direction and said superposition direction which decreases from the first end section towards the second end section.

5. The optical waveguide of claim 1, wherein said second end section has a width transverse said longitudinal direction which decreases away from said intermediate section.

6. The optical waveguide of claim 1, wherein the first portion of the intermediate section and the second end section have complementary tapers with respect to a transition between the intermediate section and the second end section.

7. The optical waveguide of claim 1, wherein said first portion and said second portion of the intermediate section are formed of a same unitary material.

8. An optical coupling arrangement, comprising:
first and second optical waveguides; and
a third optical waveguide that provides an optical propagation path between said first and second optical waveguides, third optical waveguide including:
first and second end sections for optical radiation to propagate in a longitudinal direction therebetween and an intermediate section extending between the first and second end sections, wherein:
the intermediate section includes first and second portions superposed in a superposition direction transverse to the longitudinal direction,
the first end section has a first height in said superposition direction corresponding to a sum of heights of the first and second portions of the intermediate section in said superposition direction, a top surface of the first end section being substantially coplanar with a top surface of the intermediate section and a bottom surface of the first end section being substantially coplanar with a bottom surface of the intermediate section, and the second end section has a second height in said superposition direction corresponding to the height of the first portion of the intermediate section, a top surface of the second end section being substantially coplanar with a top surface of the first portion of the intermediate section and a bottom surface of the second end section being substantially coplanar with a bottom surface of the first portion of the intermediate section.

9. The optical coupling arrangement of claim 8, wherein:
the first optical waveguide has a first refractive index contrast,
the second optical waveguide has a second refractive index contrast that is higher than said first refractive index contrast, and
said third optical waveguide has a third refractive index contrast that is intermediate between said first refractive index contrast and said second refractive index contrast.

10. The optical coupling arrangement of claim 8, wherein:
the first optical waveguide includes a glass or polymer waveguide,
the second optical waveguide includes a silicon waveguide, and
said third optical waveguide includes a silicon nitride waveguide.

11. The optical coupling arrangement of claim 8, including a waveguide cladding common to said first, second, and third optical waveguides.

12. The optical coupling arrangement of claim 8, wherein:
the first end section is joined to both the first and the second portions of the intermediate section, and
the second end section is joined to the first portion of the intermediate section.

13. The optical coupling arrangement of claim 8, wherein the first portion of the intermediate section has a width transverse to said longitudinal direction and said superposition direction which increases from said first end section towards the second end section.

14. The optical coupling arrangement of claim 8, wherein the second portion of the intermediate section has a width transverse said longitudinal direction and said superposition direction which decreases from the first end section towards the second end section.

15. The optical coupling arrangement of claim 8, wherein said second end section has a width transverse said longitudinal direction which decreases away from said intermediate section.

16. The optical coupling arrangement of claim 8, wherein the first portion of the intermediate section and the second end section have complementary tapers with respect to a transition between the intermediate section and the second end section.

17. A method of making an optical waveguide, comprising:
forming first and second end sections for optical radiation to propagate in a longitudinal direction therebetween and forming an intermediate section extending between the first and second end sections, wherein:
forming the intermediate section includes forming first and second portions superposed in a superposition direction transverse to the longitudinal direction,
the first end section has a first height in said superposition direction corresponding to a sum of heights of the first and second portions of the intermediate section in said superposition direction, a top surface of the first end section being substantially coplanar with a top surface of the intermediate section and a bottom surface of the first end section being substantially coplanar with a bottom surface of the intermediate section, and
the second end section has a second height in said superposition direction corresponding to the height of the first portion of the intermediate section, a top surface of the second end section being substantially coplanar with a top surface of the first portion of the intermediate section and a bottom surface of the second end section being substantially coplanar with a bottom surface of the first portion of the intermediate section.

18. The method of claim 17, wherein the first and second end section and the intermediate section are formed from a unitary body of material, and forming the second end section includes etching the unitary body to obtain said second height.

19. The method of claim 17, wherein the first end section and the second portion of the intermediate section are formed by depositing additional material onto a material body that includes the first portion of the intermediate section.

* * * * *

UNITED STATES PATENT AND TRADEMARK OFFICE
CERTIFICATE OF CORRECTION

PATENT NO. : 10,393,967 B2
APPLICATION NO. : 15/968625
DATED : August 27, 2019
INVENTOR(S) : Marco Piazza et al.

It is certified that error appears in the above-identified patent and that said Letters Patent is hereby corrected as shown below:

On the Title Page

Item (30) Foreign Application Priority Data:
--May 2, 2017 (IT)..... 102017000047081-- is added.

Signed and Sealed this
Tenth Day of December, 2019

Andrei Iancu
*Director of the United States Patent and Trademark Office*